US012194725B2

(12) United States Patent
Takeuchi et al.

(10) Patent No.: US 12,194,725 B2
(45) Date of Patent: Jan. 14, 2025

(54) METHOD AND APPARATUS FOR PRODUCING TRANSFER MEDIUM

(71) Applicant: RISO KAGAKU CORPORATION, Tokyo (JP)

(72) Inventors: Hiroyuki Takeuchi, Tokyo (JP); Mamoru Fukuda, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 18/369,268

(22) Filed: Sep. 18, 2023

(65) Prior Publication Data

US 2024/0116289 A1   Apr. 11, 2024

(30) Foreign Application Priority Data

Oct. 5, 2022  (JP) ................................ 2022-161118

(51) Int. Cl.
*B41F 19/00* (2006.01)
*B41F 16/00* (2006.01)
*B41F 16/02* (2006.01)
*B41F 33/16* (2006.01)

(52) U.S. Cl.
CPC ........ *B41F 16/0066* (2013.01); *B41F 16/008* (2013.01); *B41F 16/02* (2013.01); *B41F 19/004* (2013.01); *B41F 33/16* (2013.01)

(58) Field of Classification Search
CPC .... B41F 16/02; B41F 16/0066; B41F 16/008; B41F 19/004; B41F 33/16; B41F 16/0006; B41F 16/006; B41F 16/0013; B41F 19/007; C09D 1/00
See application file for complete search history.

(56) References Cited

U.S. PATENT DOCUMENTS 8,851,650 B2   10/2014  Takemoto
2021/0024239 A1 *  1/2021  Drew .................... B65C 9/1896

FOREIGN PATENT DOCUMENTS

| JP | 5533460 | 6/2014 |
| JP | 2018-51823 | 4/2018 |
| JP | 2018051823 | * 4/2018 |

* cited by examiner

*Primary Examiner* — Christopher E Mahoney
*Assistant Examiner* — Marissa Ferguson-Samreth
(74) *Attorney, Agent, or Firm* — Greenblum & Bernstein, P.L.C.

(57) ABSTRACT

A transfer medium producing apparatus is equipped with an ink ejection unit 20 that ejects ink onto a peelable sheet, an adhesive solution application unit 30 that applies an adhesive solution onto the peelable sheet onto which the ink has been ejected, and a control unit 2 that controls the ejection of ink and the application of the adhesive solution to be performed by a wet on wet method.

9 Claims, 9 Drawing Sheets

A

B

C

METHOD AND APPARATUS FOR PRODUCING TRANSFER MEDIUM

CROSS-REFERENCE TO RELATED APPLICATIONS

The present application claims priority under 35 U.S.C. § 119 to Japanese Patent Application No. 2022-161118, filed on Oct. 5, 2022. The above applications are hereby expressly incorporated by reference, in these entireties, into the present application.

BACKGROUND OF THE INVENTION

1. Field of the Invention

The present disclosure is related to a method and an apparatus for producing a transfer medium that transfers a printed image which is printed on a peelable sheet onto a target transfer medium.

2. Description of the Related Art

Conventionally, a transfer medium is known for transferring a printed image which is printed on a peelable sheet such as film to a target transfer medium. Specifically, by printing a printed image on a peelable sheet and applying an adhesive solution on the printed image, the printed image adheres to the target transfer medium by the adhesive solution during transfer to the target transfer medium, and the printed image is removed from the peelable sheet and transferred to the target transfer medium.

For example, Japanese Patent No. 5533460 proposes a method for producing a transfer medium by forming a colored layer with ink and an adhesive layer with adhesive solution on a peelable sheet in sequence by ejecting the ink and the adhesive solution from an inkjet head and adhering them to the peelable sheet.

In addition, Japanese Patent No. 5533460 proposes a method in which a heater is provided on the platen of an inkjet printing apparatus, and the heater heats a peelable sheet onto which ink has been ejected, thereby evaporating moisture from the ink.

SUMMARY OF THE INVENTION

However, if a heating step is provided as in Japanese Patent No. 5533460, a heating means such as a heater is required to evaporate the moisture from the ink, and a printing speed (peelable sheet conveyance speed) must be slowed down to secure time for the moisture in the ink to evaporate, resulting in reduced productivity.

Note that Japanese Unexamined Patent Publication No. 2018-051823 proposes an inkjet printing apparatus with a carriage that ejects a reaction fluid that agglomerates ink and a carriage that ejects ink, but this document is silent regarding the production of a transfer medium.

In view of the foregoing circumstances, the present disclosure provides a transfer medium producing apparatus and method that can improve productivity without requiring a heating process to evaporate the moisture in the ink.

A transfer medium producing apparatus of the present disclosure is equipped with an ink ejection unit that ejects ink onto a peelable sheet, an adhesive solution application unit that applies adhesive solution onto the peelable sheet onto which the ink has been ejected, and a control unit that controls the ejection of the ink and the application of the adhesive solution to be performed by a wet on wet method.

A transfer medium producing method of the present disclosure is a transfer medium producing method in which ink is ejected onto a peelable sheet and an adhesive solution is applied on the peelable sheet onto which the ink has been ejected to produce a transfer medium, and the ejection of the ink and the application of the adhesive solution are performed by a wet on wet method.

According to the transfer medium producing apparatus and the transfer medium producing method of the present disclosure, the ejection of the ink and the application of the adhesive solution are performed by the wet on wet method, which eliminates the need for a heating process to evaporate moisture from the ink, thereby improving productivity.

DETAILED DESCRIPTION OF THE EMBODIMENTS

Figure 1:
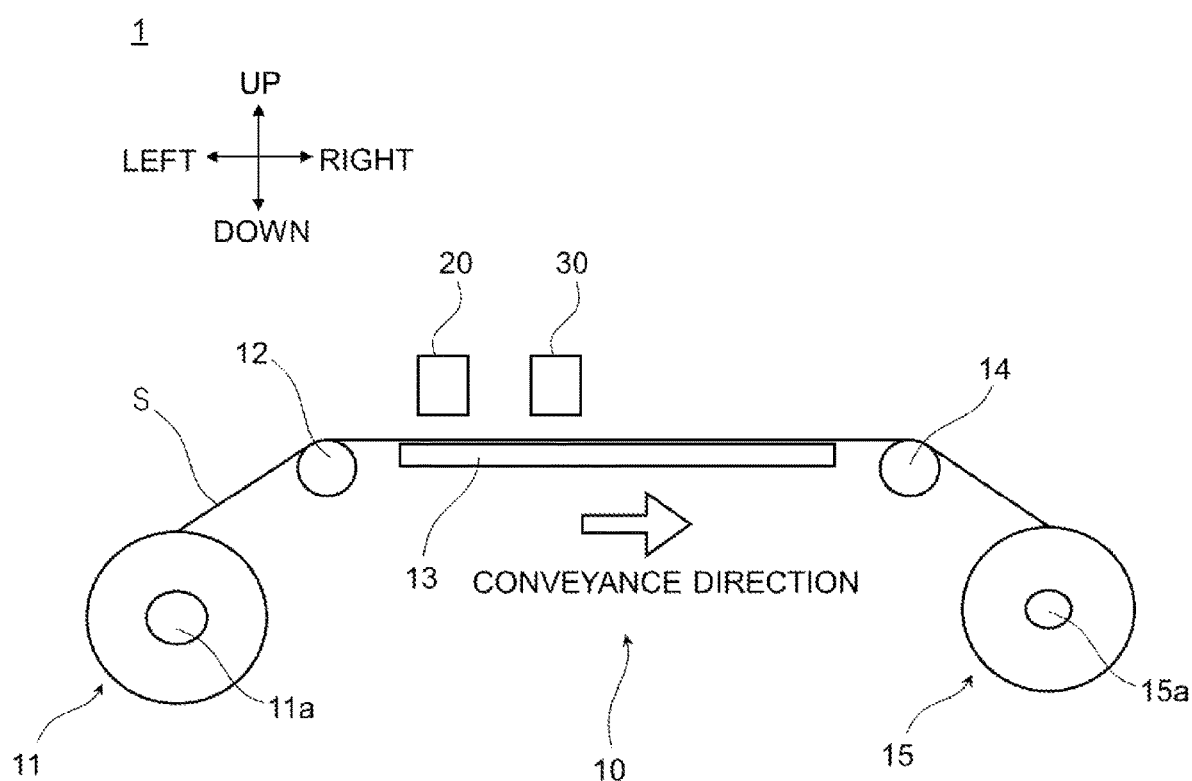
FIG. 1 is a schematic diagram that illustrates an embodiment of a main body of a transfer medium producing apparatus.

An embodiment of the transfer medium producing apparatus of the present disclosure will be described in detail below with reference to the attached drawings. FIG. 1 is a schematic diagram that illustrates a main body 1 of a transfer medium producing apparatus of the embodiment. In the present embodiment, the vertical and horizontal directions illustrated in FIG. 1 are the vertical and horizontal directions of the main body 1 of the transfer medium producing apparatus, a direction away from the drawing sheet in FIG. 1 is the front direction of the main body 1 of the transfer medium producing apparatus, and a direction toward the depth of the drawing sheet is the back direction of the main body 1 of the transfer medium producing apparatus.

The main body 1 of the transfer medium producing apparatus is equipped with a conveyance unit 10, an ink ejection unit 20, and an adhesive solution application unit 30.

The conveyance unit 10 conveys a peelable sheet S and supplies it to the ink ejection unit 20 and the adhesive solution application unit 30, in this order. A film, for example, may be employed as the peelable sheet S. However, the present disclosure is not limited to such a configuration, and any material on which a printed image can be printed and which is capable of transferring the printed image to a target transfer medium may be employed. The details of the peelable sheet S will be described later.

The conveyance unit 10 is equipped with a peelable sheet feeding unit 11, a first conveyance roller 12, a platen 13, a second conveyance roller 14, and a peelable sheet winding unit 15.

The peelable sheet feeding unit 11 is equipped with a feeding side core holding unit 11a that removably holds the core of a roll member about which the peelable sheet S is wound in the form of a roll.

The peelable sheet winding unit 15 has a winding side core holding unit 15a that removably holds a core that winds up the peelable sheet S. The winding side core holding unit 15a is coupled to a winding drive motor 15b (refer to FIG. 4) via a torque limiter (not illustrated). The transfer media producing apparatus is configured such that the winding side core holding unit 15a is rotated by the winding drive motor 15b.

The first conveyance roller 12, the platen 13, and the second conveyance roller 14 are provided between the peelable sheet feeding unit 11 and the peelable sheet winding unit 15.

The first conveyance roller 12 and the second conveyance roller 14 are roller members that extend in the front-back direction. The first conveyance roller 12 is coupled to a conveyance drive motor 12b (refer to FIG. 4). The transfer medium producing apparatus is configured such that the first conveyance roller 12 is rotated by the conveyance drive motor 12b to convey the peelable sheet S while feeding it from the peelable sheet feeding unit 11.

The first conveyance roller 12 is provided upstream of the ink ejection unit 20 in a conveyance direction, and the second conveyance roller 14 is provided downstream of the adhesive solution application unit 30 in the conveyance direction. The platen 13 is provided between the first conveyance roller 12 and the second conveyance roller 14.

The first conveyance roller 12 and the second conveyance roller 14 are installed such that the tops of their respective circumferential surfaces are at the same height as the top of the platen 13. Therefore, a back surface of the peelable sheet S which is conveyed in the downstream direction between the first and second conveyance rollers 12 and 14 slides against the top surface of the platen 13.

The transfer medium producing apparatus is configured such that, the roll member (peelable sheet S) which is held in the feeding side core holding unit 11a is fed out and wound onto the core which is held in the winding side core holding unit 15a via the first conveyance roller 12, the platen 13, and the second conveyance roller 14, by the first conveyance roller 12 and the winding side core holding unit 15a rotating.

A means for adjusting the temperature of the platen 13 may be provided in order to maintain the peelable sheet S at a constant temperature.

The ink ejection unit 20 administers printing on the peelable sheet S which is conveyed onto the platen 13. Specifically, the ink ejection unit 20 is equipped with an inkjet head that ejects ink, and administers printing by ejecting ink from the inkjet head onto the peelable sheet S.

The ink ejection unit 20 is equipped with four inkjet printheads, each of which ejects C (cyan), M (magenta), Y (yellow), and K (black) ink, for example. The ink ejection unit 20 may be configured as a so called serial head type, in which printing is performed while moving the four inkjet printheads in a direction perpendicular to the conveyance direction of the peelable sheet S, or as a line head type, in which multiple inkjet printheads that eject the same color ink are arranged in a direction perpendicular to the conveyance direction to form a line head, for example. The inks which are utilized in the present embodiment will be described in detail later.

The adhesive solution application unit 30 has an inkjet head in the same manner as the ink ejection unit 20, and ejects adhesive solution instead of ink from the inkjet head to form an adhesive layer on the peelable sheet S on which the printed image has been printed. As in the ink ejection unit 20, the adhesive solution application unit 30 may be configured as a serial head type or a line head type. By ejecting the adhesive solution from the inkjet head to form an adhesive layer as in the present embodiment, an adhesive layer can be formed on any area on the peelable sheet S. The adhesive solution which is utilized in the present embodiment will be described in detail later.

Figure 2:
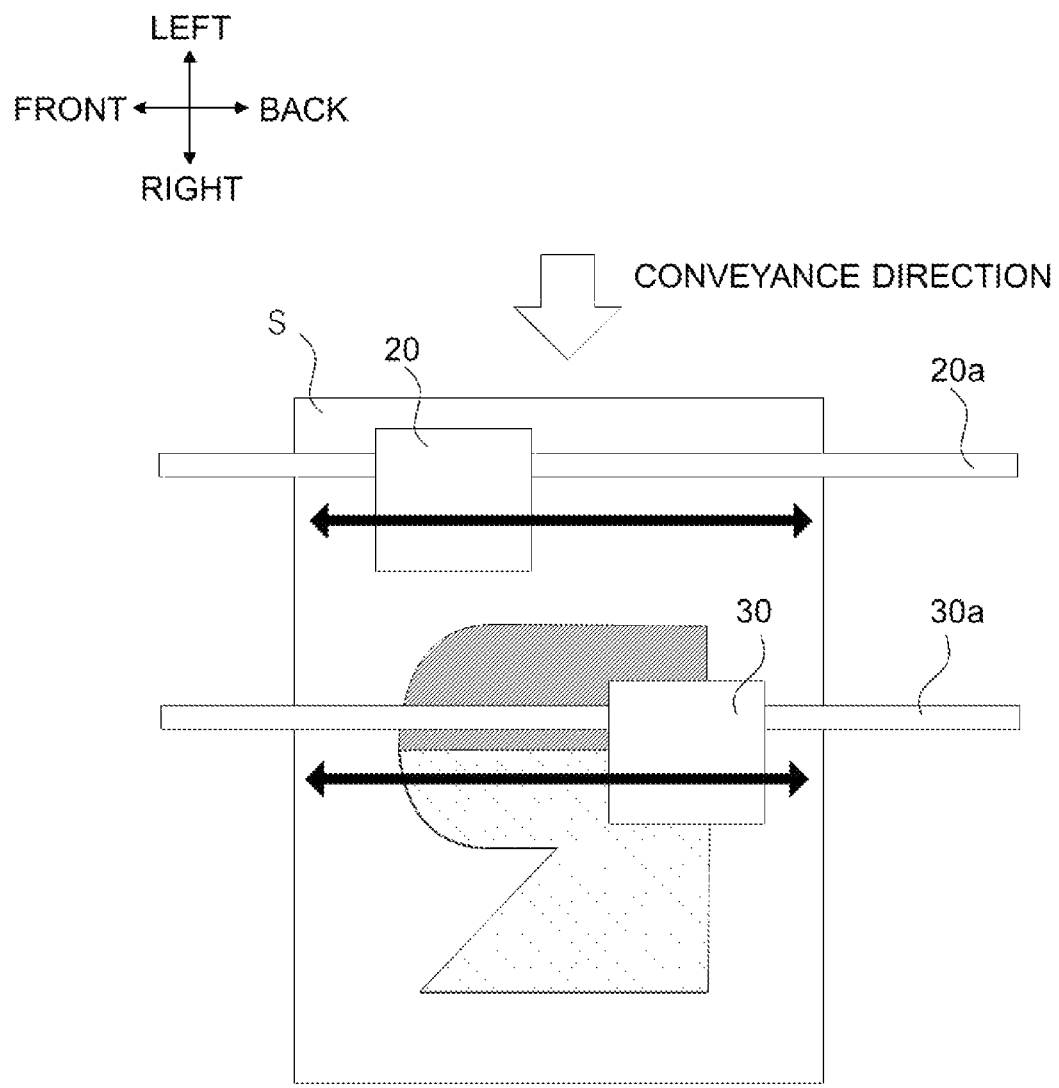
FIG. 2 is a plan view of an ink ejection unit, an adhesive application unit, and a peelable sheet illustrated in FIG. 1.

FIG. 2 illustrates the ink ejection unit 20, the adhesive solution application unit 30, and the peelable sheet S conveyed by the conveyance unit 10 as viewed from above. FIG. 2 illustrates an example for a case in which the ink ejection unit 20 and the adhesive solution application unit 30 are serial head systems.

The ink ejection unit 20 is configured to be movable along a first scanning mechanism 20a, which is provided to extend in a direction perpendicular to the conveyance direction of the conveyance unit 10. In the present embodiment, the first scanning mechanism 20a corresponds to a first moving mechanism of the present disclosure.

The adhesive solution application unit 30 is configured to be movable along a second scanning mechanism 30a, which is provided to extend in a direction perpendicular to the conveyance direction of the conveyance unit 10. In the present embodiment, the second scanning mechanism 30a corresponds to a second moving mechanism of the present disclosure.

In the configuration illustrated in FIG. 2, ink is first ejected from the ink ejection unit 20 onto the conveyed peelable sheet S to form a printed image on the peelable sheet S. Specifically, when a predetermined area of the peelable sheet S is conveyed to a position directly under the ink ejection unit 20, the ink ejection unit 20 ejects ink onto the predetermined area while moving in a direction perpendicular to the conveyance direction along the first scanning mechanism 20a, thereby forming a printed image on the predetermined area. The area where the printed image is formed by the ink ejection unit 20 is further conveyed toward the adhesive solution application unit 30.

After the printed image has been formed by the ink ejection unit 20, when the area where the printed image has been formed is conveyed to a position directly under the adhesive solution application unit 30, the adhesive solution application unit 30 ejects the adhesive solution onto the area where the printed image has been formed while moving in a direction perpendicular to the conveyance direction along the second scanning mechanism 30a, thereby forming an adhesive layer on the area where the printed image has been formed.

In FIG. 2, the area which is shaded by small dots is the area where the adhesive layer is formed on the printed image, and the area which is hatched is an area of the printed image prior to the adhesive solution being applied thereon.

Figure 3:
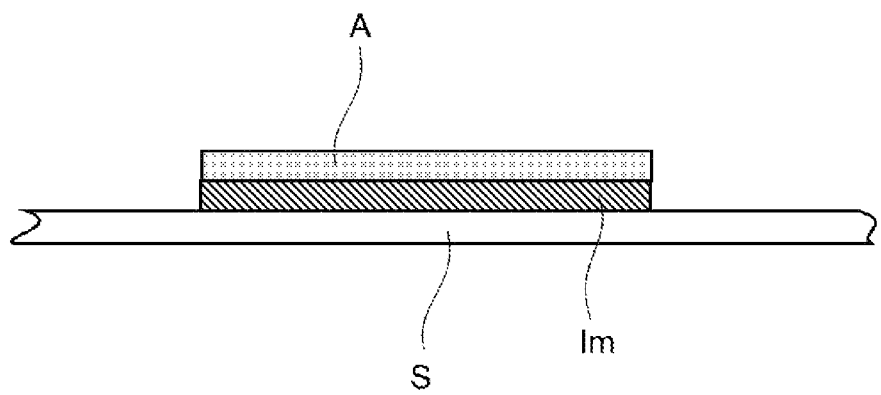
FIG. 3 is a cross sectional diagram of a transfer medium in a thickness direction thereof.

While the peelable sheet S is being conveyed as described above, the ink is ejected by the ink ejection unit 20 and the adhesive solution is ejected by the adhesive solution application unit 30 sequentially in this order, such that an entire printed image is printed and the adhesive layer is formed over the entire printed image to produce a transfer medium. FIG. 3 schematically illustrates a cross section of the transfer medium in the thickness direction thereof. Reference symbol Im denotes the printed image and reference symbol A denotes the adhesive layer in FIG. 3.

Here, in the present embodiment, the ejection of the ink onto the peelable sheet S and the application of the adhesive solution onto the printed image are performed by the wet on wet method. The wet on wet method is a method in which a next liquid is applied to a previously applied area in a state in which a previously applied liquid is not yet dry. In the present embodiment, the adhesive solution is applied onto the area where the previously ejected ink was ejected in a state in which the previously ejected ink is not yet dry.

Figure 4:
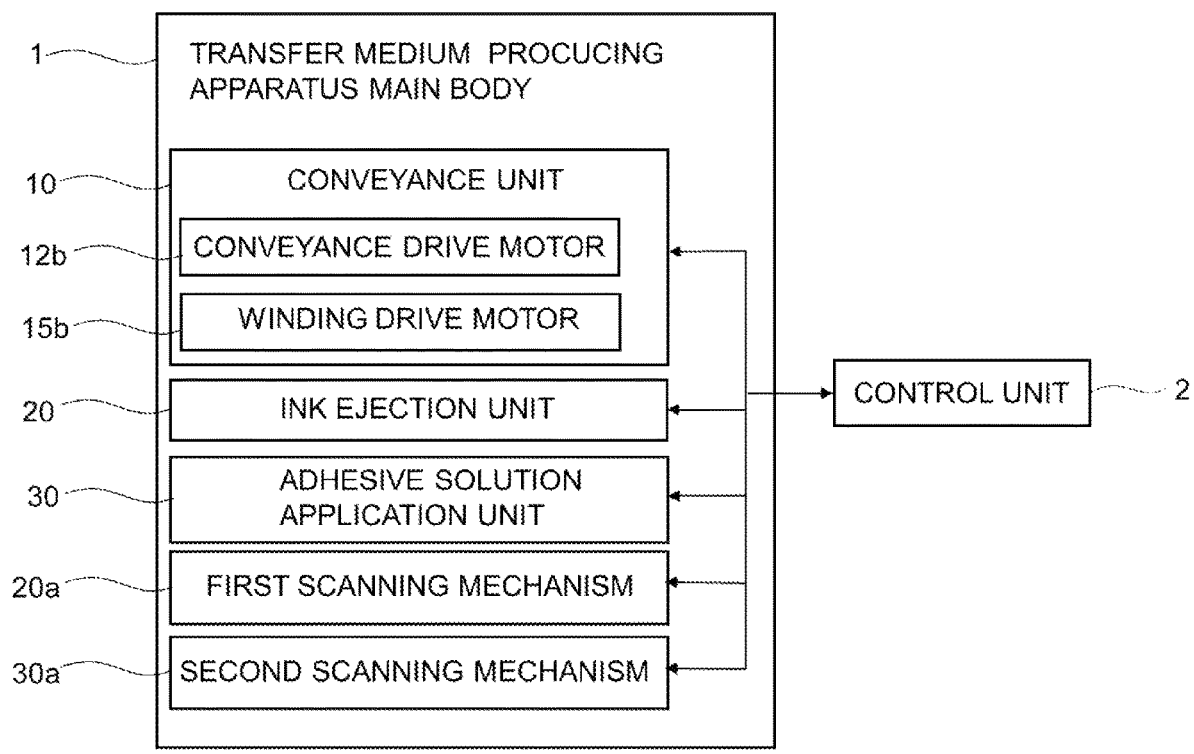
FIG. 4 is a block diagram that illustrates the configuration of a control system of the embodiment of the transfer medium producing apparatus.

Next, FIG. 4 is a block diagram that illustrates the configuration of a control system of the transfer medium producing apparatus. The main body 1 of the transfer medium producing apparatus illustrated in FIG. 1 operates each component of the targets of control illustrated in FIG. 4 in response to control signals from a control unit 2. In the present embodiment, the control unit 2 corresponds to the control unit of the present disclosure.

The control unit 2 and the main body 1 of the transfer medium producing apparatus are connected by USB (Universal Serial Bus). Alternatively, they may also be connected by communication lines such as a LAN (Local Area Network) or the Internet.

The control unit 2 is constituted by a computer equipped with a CPU (Central Processing Unit), semiconductor memory, a hard disk, etc. The control unit 2 controls each component illustrated in FIG. 4 by executing a control program stored in advance in a storage medium such as semiconductor memory or a hard disk and by operating electrical circuits based on image data that represent a printed image.

In particular, the control unit 2 controls the ink ejection unit 20 and the first scanning mechanism 20a to form a printed image on the peelable sheet S, and controls the adhesive solution application unit 30 and the second scanning mechanism 30a to apply the adhesive solution on the peelable sheet S on which the printed image has been formed.

The control unit 2 controls the conveyance speed at which the peelable sheet S is conveyed by the conveyance unit 10 and the scanning speeds of the first scanning mechanism 20a and the second scanning mechanism 30a such that the ink is ejected and the adhesive solution is applied by the wet on wet method as described above.

Specifically, the control unit 2 controls the conveyance speed of the conveyance unit 10 and the scanning speeds of the first scanning mechanism 20a and the second scanning mechanism 30a such that the amount of time from a point in time at which the ink is ejected onto the predetermined area by the ink ejection unit 20 to a point in time at which the adhesive solution is applied to the predetermined area is 100 seconds or less, for example. Note that the amount of time from the point in time at which the ink is ejected onto the predetermined area to the point in time at which the adhesive solution is applied to the predetermined area is preferably within 50 seconds, and even more preferably within 30 seconds.

According to the transfer medium producing apparatus of the present embodiment, the wet on wet method is employed to eject the ink and the adhesive solution. Therefore, there is no need for a conventional ink heating apparatus or a heating time, which enables the configuration of the apparatus and a production process to be simplified, and improves productivity.

In the transfer medium producing apparatus of the present embodiment, the ink ejection unit 20 and the adhesive solution application unit 30 are arranged at different positions with respect to the conveyance direction, and they are scanned by the first scanning mechanism 20a and the second scanning mechanism 30a to eject the ink and to apply the adhesive solution. This makes it possible to eject or apply appropriate amounts of ink and adhesive solution without changing the printing speed, that is, without reducing productivity.

The control unit 2 controls the adhesive solution application unit 30 and the ink ejection unit 20 such that an amount of adhesive solution applied per unit time by the adhesive solution application unit 30 is greater than an amount of ink ejected per unit time by the ink ejection unit 20. Specifically, in the case that a maximum density of one dot formed by the ink ejection unit 20 is X, for example, the amount of adhesive solution applied to that dot by the adhesive solution application unit 30 is 2X. This enables sufficient adhesive strength to be obtained when transferring the printed image on the transfer medium to a target transfer medium.

As a method of controlling the amount of the adhesive solution which is applied by the adhesive solution application unit 30 and the amount of the ink which is ejected by the ink ejection unit 20 as described above, a drive frequency of the inkjet head of the adhesive solution application unit 30 may be set to be higher than a drive frequency of the inkjet heads of the ink ejection unit 20. This enables the number of applied drops of adhesive solution per unit time to be greater than the number of ejected ink drops per unit time, facilitating control of the amount of ejected ink and the amount of applied adhesive solution.

In the case that the drive frequency of the inkjet head of the adhesive solution application unit 30 is set to be higher than the drive frequency of the inkjet heads of the ink ejection unit 20 as described above, the scanning speed of the second scanning mechanism 30a of the adhesive solution application unit 30 may be set to be slower than the scanning speed of the first scanning mechanism 20a of the ink ejection unit 20.

As an alternative method of controlling the amount of the adhesive solution which is applied by the adhesive solution application unit 30 and the amount of ink which is ejected by the ink ejection unit 20, the amount of one drop may be controlled by controlling the magnitudes of drive voltages and drive waveforms, rather than controlling the number of drops as described above.

The control unit 2 may control the ink ejection unit 20 and the adhesive solution application unit 30 such that a resolution of the adhesive solution which is applied by the adhesive solution application unit 30 is lower than a resolution of the ink which is ejected by the ink ejection unit 20. That is, the adhesive layer which is formed by the adhesive solution application unit 30 does not need to have as high a resolution as that of the printed image, and therefore the adhesive solution may be ejected at a lower resolution.

Specifically, a dot resolution of the adhesive solution ejected from the inkjet head of the adhesive solution application unit 30 may be reduced to be less than a dot resolution of the printed image, for example. By decreasing the dot resolution of the adhesive solution in the direction perpendicular to the conveyance direction of the peelable sheet S, the scanning speed of the adhesive solution application unit 30 by the second scanning mechanism 30a can be increased, resulting in a reduction in the scanning time, thereby improving productivity, for example.

In the embodiment described above, the ink ejection unit 20 and the adhesive solution application unit 30 are scanned independently of each other by the first scanning mechanism 20a and the second scanning mechanism 30a, respectively. However, the present disclosure is not limited to such a configuration. For example, Inkjet heads 21 to 24 that constitute the ink ejection unit 20 and an inkjet head 31 that constitutes the adhesive solution application unit 30 may be installed on the same carriage 40, and the carriage 40 may be scanned in a direction perpendicular to the conveyance direction of the peelable sheet S to eject the ink and apply the adhesive solution, as illustrated in FIG. 5.

Figure 5:
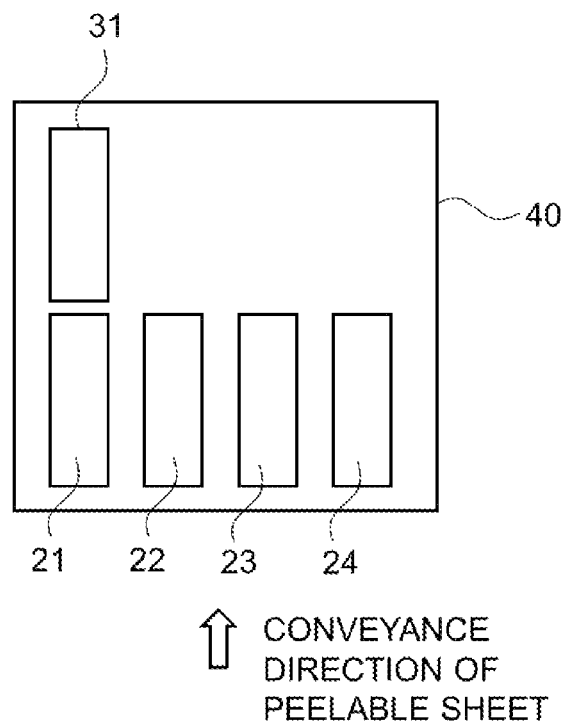
FIG. 5 is a diagram that illustrates an example of an inkjet head that ejects ink and an inkjet head that ejects adhesive solution provided on a single carriage.

The four inkjet heads 21 to 24 are located upstream in the conveyance direction of the peelable sheet S, and the inkjet printhead 31 that ejects adhesive solution is located downstream in the conveyance direction in the carriage 40, as illustrated in FIG. 5.

Figure 6:
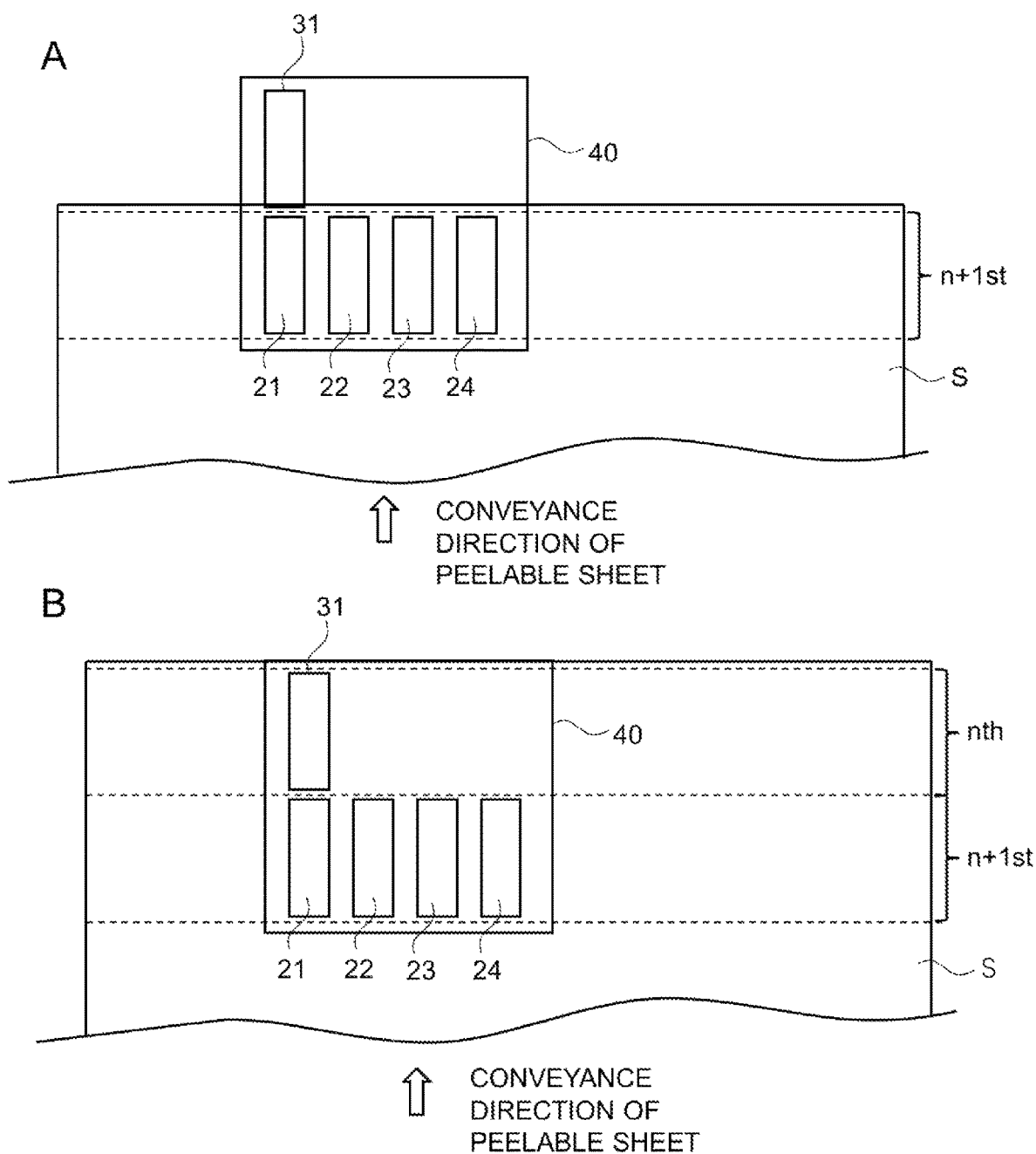
FIG. 6 is a collection of diagrams that illustrate a method of producing a transfer medium that employs the carriage illustrated in FIG. 5.

In the case that the carriage 40 is employed, the ink is first ejected by the four inkjet printheads 21 to 24 onto an n-th scanning range to form a printed image, as illustrated in FIG. 6A. Then, the adhesive solution is ejected by the inkjet printhead 31 onto the n-th scanning range, and ink is ejected by the inkjet heads 21 to 24 onto an n+1st scanning range by conveying the peelable sheet S for one scanning range and scanning the carriage 40 in the direction perpendicular to the conveyance direction, as illustrated in FIG. 6B.

An entire printed image is formed and the adhesive solution is applied on the entire printed image by alternately repeating the scanning of the carriage 40 and the conveyance of the peelable sheet S for one scanning range in this manner.

Employing the carriage 40 as described above simplifies the configuration of the apparatus.

In the case that the color of a target transfer medium such as a T shirt, for example, is black, if a printed image is formed with C, M, Y, and K inks as in the above embodiment, there is a possibility that the black color of the target transfer medium will show through the printed image when the printed image of the transfer medium is transferred to the black target transfer medium.

Figure 7:
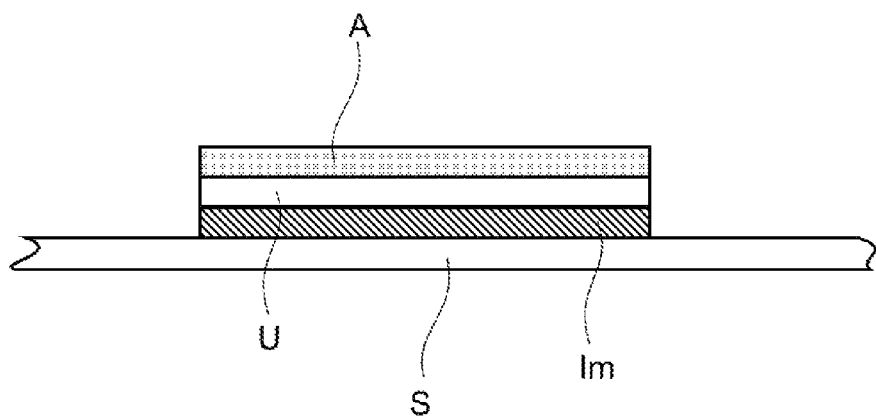
FIG. 7 is a cross-sectional diagram of a transfer medium with a base layer in the thickness direction thereof.

Therefore, a white single-color image U may be formed between the adhesive layer A and the printed image Im, as in the transfer medium illustrated in FIG. 7, for example. By forming a single color image U in this manner, when the printed image of the transfer medium is transferred to a black T shirt, etc. as the target transfer medium, the black color will not show through the printed image, because the white single-color image is formed between the printed image and the target transfer medium. This enables the colors of the printed image to be clearly visible without the black color showing through. Note that a single-color image is an image formed from a single color. In the present embodiment, white is employed, but the present disclosure is not limited to such a configuration, and colors other than white may also be employed.

Figure 8:
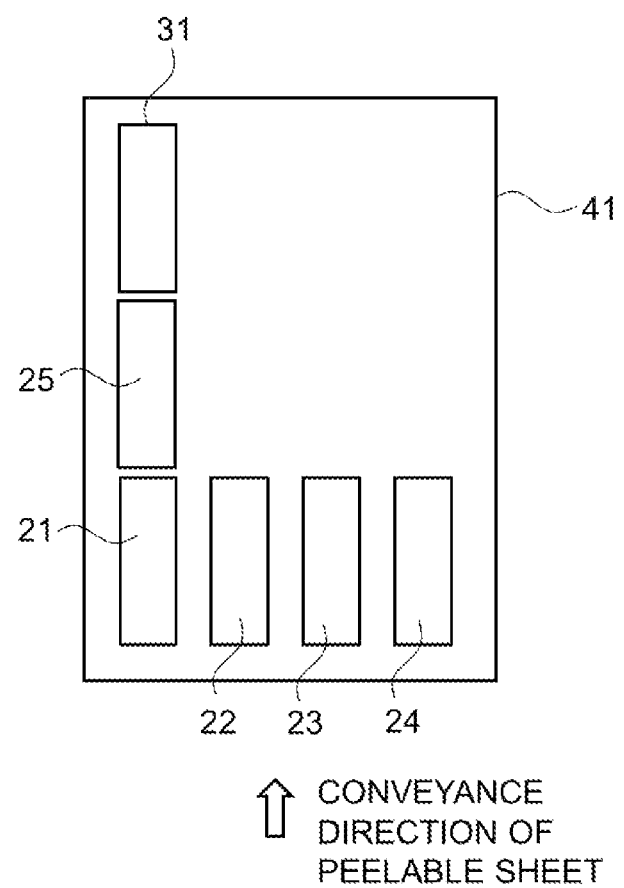
FIG. 8 is a diagram that illustrates an example of a carriage for producing the transfer medium illustrated in FIG. 7.

FIG. 8 illustrates an example of the configuration of a carriage 41 for forming the transfer medium illustrated in FIG. 7.

An inkjet head 25 that ejects white ink is further arranged between the inkjet heads 21 to 24 and the inkjet head 31 in the carriage 41 in addition to the components of the carriage 40 illustrated in FIG. 7, as illustrated in FIG. 8. In the present embodiment, the inkjet heads 21 to 24 correspond to a first head unit of the disclosure, and the inkjet head 25 corresponds to a second head unit of the disclosure.

Figure 9:
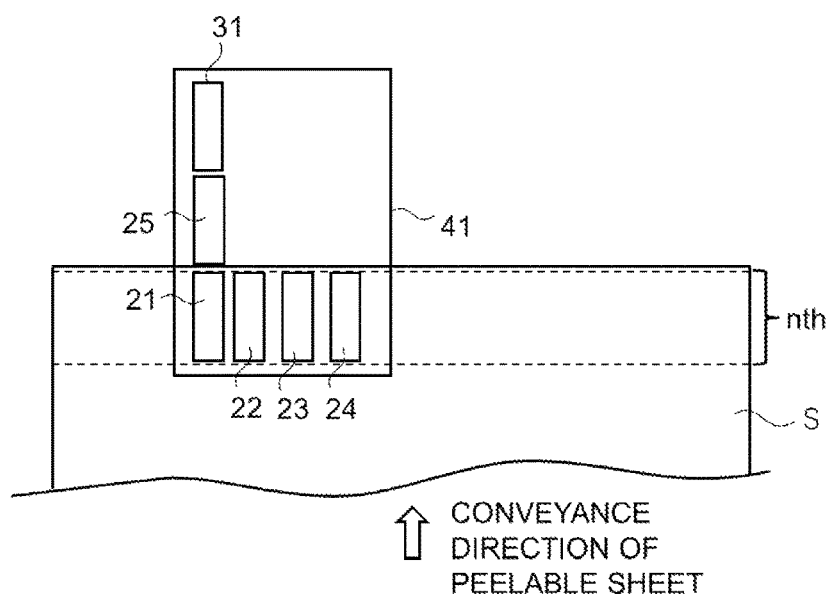
FIG. 9 is a collection of diagrams that illustrate a production method of a transfer medium that employs the carriage illustrated in FIG. 8.
Figure 9:
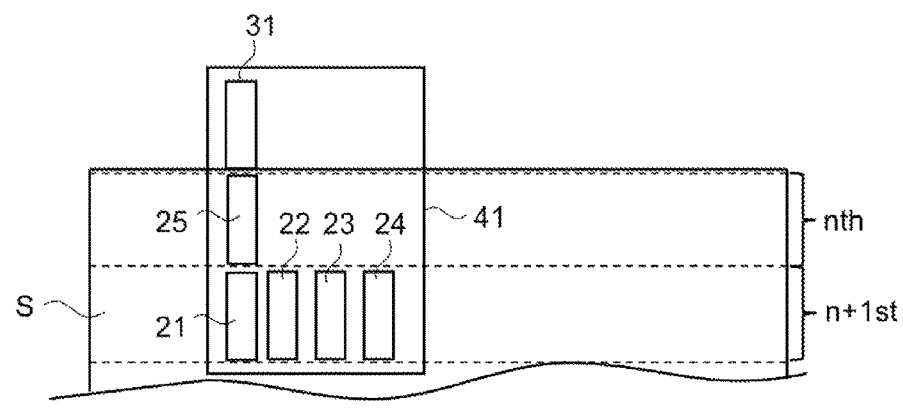
Figure 9:
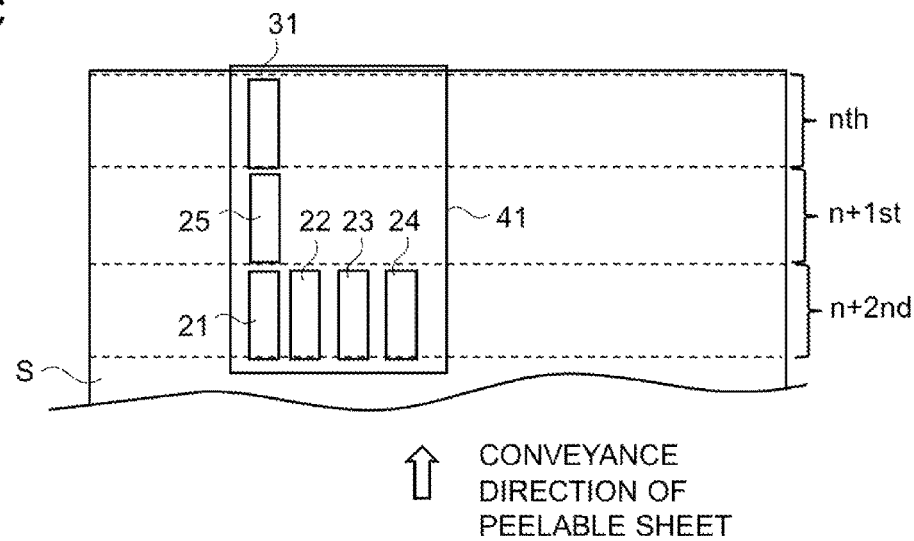

In the case that the carriage 41 illustrated in FIG. 8 is employed, ink is first ejected by the inkjet heads 21 to 24 onto an n-th scanning range to form a printed image Im, as illustrated in FIG. 9A. Then, the peelable sheet S is conveyed for one scanning range, and white ink is ejected by the inkjet printhead 25 in the n-th scanning range to form a single color image U on the printed image Im, while ink is ejected by the inkjet heads 21 to 24 onto an n+1st scanning range to form the printed image Im, as illustrated in FIG. 9B.

Then, the peelable sheet S is conveyed for one more scanning range, adhesive solution is ejected by the inkjet head 31 onto the nth scanning range to form an adhesive layer A on the single-color image U, white ink is ejected by the inkjet head 25 onto the n+1st scanning range to form the single color image U on the image Im, and ink is further ejected from the inkjet heads 21 to 24 onto an n+2nd scanning range to form the printed image Im, as illustrated in FIG. 9C.

The printed image Im is formed, the single color image U is formed on the printed image Im, and the adhesive solution is applied on the entire single color image U by alternately repeating the scanning of the carriage 41 and the conveyance of the peelable sheet S for one scanning range in this manner.

Next, examples of the ink which is utilized in the transfer medium producing apparatus of the above embodiment will be described. The present embodiment employs a water based ink. A water based ink is an aqueous composition that contains color materials.

Color materials may include pigments, dyes, or combinations thereof. Pigments may be employed preferably in terms of weather resistance and water resistance of an image in a state in which the image is formed on a transfer medium, and also in a state in which the image is transferred to a target transfer medium.

Pigments may be preferably blended in the ink as pigment dispersions. As pigment dispersions, the pigments are those which can be dispersed in a solvent, and can be in a dispersed state in the ink. Pigments dispersed in water by a pigment dispersing agent, self-dispersing pigments dispersed in water, microencapsulated pigments coated with a resin and dispersed in water, etc. may be employed, for example.

Organic pigments such as azo pigments, phthalocyanine pigments, polycyclic pigments, dyed rake pigments, and inorganic pigments such as carbon blacks and metal oxides, may be employed as the pigments. Examples of azo pigments include soluble azo lake pigments, insoluble azo pigments, and condensed azo pigments. Examples of phthalocyanine pigments include metal phthalocyanine pigments and metal free phthalocyanine pigments. Examples of polycyclic pigments include quinacridone pigments, perylene pigments, perinone pigments, isoindoline pigments, isoindolinone pigments, dioxazine pigments, thioindigo pigments, anthraquinone pigments, quinophthalone pigments, metal complex pigments, and diketopyrrolopyrrole (DPP). Examples of carbon blacks include furnace carbon black, lamp black, acetylene black, channel black, etc. Examples of metal oxides include titanium dioxide, zinc oxide, etc. These pigments may be employed alone or in combination of two or more.

It is preferable for the average particle size of the pigments to be within a range from 10 to 500 nm, and more preferably within a range from 10 to 200 nm. It is preferable for the average particle size of the pigments to be 10 nm or greater from the viewpoint of coloring properties, and 500 nm or less from the viewpoint of dispersion stability. For inkjet inks, 500 nm or less is preferred from the viewpoint of ejection properties. In the present specification, the average particle size of the pigments is a volume based average particle size, which is a numerical value measured by the dynamic light scattering method.

Pigment dispersing agents represented by polymer dispersing agents and surfactants may be favorably employed, in order to stably disperse pigments in the ink. Examples of commercially available polymer dispersing agent products include "TEGO Dispers 740W, 750W, 755W, and 760W" in the TEGO Dispers series produced by Evonik Japan Co., Ltd., Solsperse 2000, 27000, 41000, 4 3000, 44000, and 46000" in the Solsperse series produced by Japan Lubirizol Co., Ltd., "Joncryl 57J, 60J, and 63J" in the Joncryl series produced by BASF Japan Co., Ltd., "DISPERBYK-102, 185, 190, 193, and 199" and "BYKJET-9152" produced by BYK Japan Co., Ltd., etc. (all are product names).

Nonionic surfactants may be employed as surfactant type dispersing agents, considering the dispersion stability of pigments in ink. Examples of commercially available surfactant type dispersing agents include nonionic surfactants such as "Emulgen A-60, A-90, A-500, and 420" in the Emulgen series produced by Kao Corporation (all are product names).

One or more pigment dispersing agents may be employed alone or in combination. In the case that a pigment dispersing agent is employed, the content of the pigment dispersing agent will differ according to the type thereof, and is not particularly limited. It is preferable for the content of the pigment dispersing agent to be within a range from 0.005 to 2.0, more preferably within a range from 0.01 to 1.0, and still more preferably within a range from 0.1 to 0.5 as a mass ratio of active components with respect to 1 of the pigment.

Self-dispersing pigments may be employed as the pigments. Self-dispersing pigments are pigments with hydrophilic functional groups introduced into the surface of the pigment by a chemical process or a physical process. Ionic functional groups are preferred as the hydrophilic functional groups to be introduced into self-dispersing pigments. By charging the surface of a pigment anionically or cationically, particles of the pigment can be stably dispersed in water by electrostatic repulsive force. Carboxy groups, sulfo groups, phosphate groups, etc. are preferred as anionic functional groups. Quaternary ammonium groups, quaternary phosphonium groups, etc. are preferred as cationic functional groups.

These hydrophilic functional groups may be bonded directly to the surface of the pigment or via other atomic groups. Examples of the other atomic groups include, but are not limited to, alkylene, phenylene, and naphthylene groups. Examples of methods for processing the surface of the pigment include diazotization, sulfonation, a hypochlorite process, a humic acid process, vacuum plasma process, etc.

Examples of self-dispersing pigments include "CAB-O-JET200", "CAB-O-JET300", "CAB-O-JET250C", "CAB-O-JET260M", "CAB-O-JET270", and "CAB-O-JET450C" from the CAB-O-JET series produced by Cabot Corporation, "BONJET BLACK CW-1", "BONJET BLACK CW-2", "BONJET BLACK CW-3", "BONJET BLACK CW-4" produced by Orient Chemical Industries Corporation, etc. (all are product names).

Pigment dispersions in which pigments are dispersed in advance by pigment dispersing agents may also be employed. Examples of commercially available pigment dispersions dispersed by pigment dispersing agents include the HOSTAJET Series produced by Clariant Ltd. and the FUJI SP series produced by Fuji Pigment Co., Ltd. Microencapsulated pigments in which pigments are coated with resin may also be employed as the pigment.

Dyes may be blended as the color material. Dyes which are commonly employed in the technical field of printing may be employed as the dyes, and are not particularly limited. Specific examples of dyes include, basic dyes, acid dyes, direct dyes, soluble batt dyes, acid mordant dyes, mordant dyes, reactive dyes, batt dyes, sulfide dyes, etc. Among these, those that are water soluble and those that become water soluble by reduction, etc. can be favorably employed. More specifically, azo dyes, rhodamine dyes, methine dyes, azomethine dyes, xanthene dyes, quinone dyes, triphenylmethane dyes, diphenylmethane dyes, methylene blue, etc. are examples of such dyes.

The color materials may be employed alone or in combinations of two or more types. It is preferable for the content of the color materials to be within a range from 0.1 to 20% by mass, more preferably a range from 1 to 10% by mass, and still more preferably a range from 2 to 5% by mass with respect to the total amount of the ink. In the case that a white pigment is employed as a water based ink to form a base color layer it is preferable for the content of the white pigment to be within a range from 1 to 30% by mass, more preferably a range from 5 to 20%, and still more preferably a range from 10 to 15% by mass in order to improve the opacity of a target transfer medium.

The water based ink may further contain a surfactant. The surfactant may further enhance the permeability or wettability of the ink to the peelable sheet S and improve ink coating properties.

Nonionic surfactants, anionic surfactants, cationic surfactants, amphoteric surfactants, or combinations thereof may be favorably employed as surfactants, with nonionic surfactants being preferred. One or a combination of two or more surfactants from among those described above for water based adhesive solutions may be employed as surfactants. It is preferable for the content of the surfactant as an active component to be within a range from 0.1 to 5% by mass and more preferably a range from 0.2 to 2% by mass with respect to the total amount of the water based ink.

The water based ink may further contain a binder resin. The binder resin may be a water dispersible resin, a water soluble resin, or a combination thereof. By employing a water based ink that contains a binder resin, a resin coating film can be formed on the peelable sheet S to further enhance image fixation and coating strength. In the case that a transfer medium with an image formed in this manner is employed, the fixability and coating film strength of the image on a target transfer medium can be enhanced and the robustness of the image can be further improved even in a state in which the image has been transferred to the target transfer medium.

Examples of water dispersible resins include conjugated diene resins such as styrene butadiene copolymers, methyl methacrylate butadiene copolymers, and vinyl chloride vinyl acetate copolymers; (meth) acrylic resins; vinyl resins such as ethylene vinyl acetate copolymers; or functional group modified resins which are modified by monomers containing functional groups such as carboxy groups of these various resins; urethane resins; melamine resins; urea resins; polyester resins, polyolefin resins, silicone resins, polyvinyl butyral resins, alkyd resins, etc. By introducing hydrophilic functional groups into these resins or by processing the surfaces surface thereof with dispersing agents, etc., oil in water type resin emulsions may be formed, which may then be fed into a water based adhesive solution. It is preferable for the average particle size of the water dispersible resin to be within a range from 10 to 300 nm and more preferably a range from 50 to 150 nm, from the viewpoint of inkjet ejection properties. It is also preferable for the average particle size of the resin particles in the resin emulsion which is introduced into the water based ink to satisfy these ranges.

Examples of water soluble resins include polyvinyl alcohol, poly (meth) acrylic acid, neutralized poly (meth) acrylic acid, (meth) acrylic acid/maleic acid copolymers, (meth) acrylic acid/sulfonic acid copolymers, and styrene/maleic acid copolymers.

It is preferable for the binder resin to be contained within a range from 1 to 20% by mass and more preferably a range from 5 to 10% by mass with respect to the total mass of the water based ink. In the case that white pigment is employed as a water based ink to form the base color layer, the content of white pigment should be increased to improve the opacity of the target transfer medium, and the content of binder resin should also be increased to match the content of white pigment.

From this viewpoint, in the case of a water based ink that contains white pigment, it is preferable for the binder resin to be contained within a range from 1 to 30% by mass, more preferably a range from 5 to 20% by mass, and still more preferably a range from 10 to 15% by mass with respect to the total mass of the water based ink.

It is preferable for the water based ink to contain water, and water may be the main solvent. The details of water are as described above in connection with the water based adhesive solution. From the viewpoint of viscosity adjustment, it is preferable for the content water to be within a range from 20 and 90% by mass, more preferably a range from 30 and 80% by mass, and still more preferably a range from 40 and 80% by mass with respect to the total amount of the ink.

The water based ink may further contain a water soluble organic solvent in addition to or instead of water. One or a combination of two or more types of water soluble organic solvents from among those described above in connection with the water based adhesive solution may be employed as the water soluble organic solvent. From the viewpoints of wettability, moisture retention effect, viscosity adjustment, etc., it is preferable for the content of the water soluble organic solvent to be within a range from 1 to 80% by mass, more preferably a range from 10 to 50% by mass, and still more preferably a range from 20 to 40 mass % with respect to the total amount of the ink. It is preferable for the total amount of the water soluble organic solvent and water should to be within a range from 50 to 98% by mass, 60 to 95% by mass, or 70 to 95% by mass with respect to the total mass of the water based ink In addition to the components described above, the water based ink may optionally contain various additives such as rust inhibitors, preservatives, antioxidants, UV absorbers, infrared absorbers, cross linking agents, pH adjusters, defoaming agents, wetting agents (humectants), surface tension adjusters (penetrating agents), fixing agents, etc. It is preferable for the total amount of such various additives to be 10% by mass or less, more preferably 5% by mass or less, and still more preferably 1% by mass or less with respect to the total mass of the water based ink.

It is preferable for the viscosity of the water based ink to be within a range from 1 to 40 mPa·s at 23° C., more preferably a range from 4 to 20 mPa·s, and still more preferably a range from 3 to 15 mPa in order to obtain ejection properties suitable for inkjet ink. The viscosity of the water based ink can be measured in accordance with the method for measuring the viscosity of the water based adhesive solution described above.

It is preferable for the surface tension of the water based ink to be within a range from 20 to 40 mN/m at 23° C. The surface tension of the water based ink can be measured in accordance with the method for measuring the viscosity of the water based adhesive solution described above.

The method of producing the water based ink is not particularly limited, and a desired ink may be obtained by mixing each component as appropriate. A dispersing machine such as a bead mill can be employed to enhance the dispersibility of the pigments, for example. A resulting composition may also be filtered by employing a filter or other means. In addition, various additives may be added as appropriate.

Next, examples of the adhesive solution which is employed in the above embodiment of the transfer medium producing apparatus will be described. The present embodiment employs a water based adhesive solution.

The water based adhesive solution is characterized in that it contains a resin A and a resin B whose glass transition temperature is higher than that of the resin A by 80° C. or greater. According to this production method, it is possible to provide a method for producing a transfer medium having superior robustness of an image which is transferred from the transfer medium to a target transfer medium.

By the water based adhesive solution containing the resin A with a low glass transition temperature (Tg) and resin B with a high glass transition temperature and the difference between the glass transition temperature of the resin A and the glass transition temperature of the resin B being 80° C. or greater, a favorable balance can be achieved between adhesive properties with respect to the target transfer medium and a strength of the adhesive layer on the target transfer medium. In greater detail, by the water based adhesive solution containing the resin A with a low glass transition temperature, adhesion properties with respect to the target transfer medium can be improved in the obtained transfer medium. In addition, by the water based adhesive solution also containing the resin B with a high glass transition temperature, the strength of the adhesive layer can be improved in the target transfer medium to which the image is transferred from the obtained transfer medium. Thereby, target transfer media having superior transfer properties and robustness for various materials, ranging from soft target transfer media with elasticity, such as cloth, to hard target transfer media, such as wood, metal, glass, plastic, and ceramics, can be obtained.

With respect to the above operational effects, it is considered that the resin A, which has a low glass transition temperature, fits well within an uneven shape of a surface of a target transfer medium and imparts as a wedge effect, thereby improving adhesion. In addition, it is considered that the resin B, which has a high glass transition temperature and exists in the matrix of resin A in the form of islands in a state in which the water based adhesive solution is applied to the transfer medium, deforms plastically and absorbs energy when external force is applied, which is thought to have the effect of suppressing cohesive breakdown of the adhesive layer. Here, it is important to design an interfacial strength such that interfacial delamination does not occur with the matrix of resin A, which has a low glass transition temperature, until resin B, which has a high glass transition temperature, undergoes plastic deformation.

In a preferred embodiment, a resin with a glass transition temperature of less than 0° C. as the resin A may have a superior adhesion effect. In addition, a resin with a glass transition temperature of greater than 95° C. as the resin B may provide better strength for the adhesive layer. In a more preferred embodiment, when resin B with a glass transition temperature of greater than 95° C. is employed in combination with a matrix of resin A with a glass transition temperature of less than 0° C., the interface strength is maintained high, the toughness of the adhesive layer is increased in a target transfer medium, and adhesive strength is also increased.

The difference in glass transition temperatures between the resin A and the resin B is more preferably 90° C. or greater, 100° C. or greater, 110° C. or greater, or 120° C. or In addition, it is preferable for the difference in glass transition temperatures between the resin A and the resin B in the water based adhesive solution to be 200° C. or less, 150° C. or less, or 130° C. or less from the viewpoints of reducing resin stickiness and adhesive properties of the transfer medium.

It is preferable for the glass transition temperature of the resin A in the water based adhesive solution to be less than 0° C. The glass transition temperature of the resin A may be −5° C. or less, −10° C. or less, −15° C. or less, or −20° C. or less. In these ranges, the close contact adhesive properties of the transfer medium to the target transfer medium can be further improved. It is preferable for the glass transition temperature of the resin B in the water based adhesive solution to be greater than 95° C. The glass transition temperature of the resin B may be 98° C. or greater, or 100° C. or greater. In these ranges, the strength of the adhesive layer can be further improved in the target transfer medium to which the image is transferred from the transfer medium.

In the water based adhesive solution, it is preferable for the glass transition temperature of the resin A to be less than 0° C. or the glass transition temperature of the resin B to be greater than 95° C. In the water based adhesive solution, it is more preferable for the glass transition temperature of the resin A to be less than 0° C. and for the glass transition temperature of resin B to be greater than 95° C. As described above, this will have the effects of increasing the toughness of the adhesive layer and increasing the adhesive strength at the target transfer medium.

In the present specification, glass transition temperatures (Tg) are measured by differential scanning calorimetry (DSC). In greater detail, glass transition temperatures may be measured by the method to be described below. A thermal analyzer (Thermoplus EVO2DSC8231) produced by Rigaku Corporation, etc. may be employed to perform differential scanning calorimetry (DSC). As measurement conditions, a sample is prepared by raising the temperature thereof from room temperature to 200° C. at a rate of 10° C./min and then cooling it from 200° C. to −50° C. at a rate of 10° C./min. The temperature is then increased at a rate of 10° C./min, and the temperature at an intersection of an extension of a baseline below a maximum peak endothermic temperature and a tangent line that represents a maximum slope from a rising edge of a peak to apex of the peak is the glass transition temperature.

In the case of resins for which it is difficult to measure glass transition temperatures by differential scanning calorimetry (DSC), glass transition temperatures measured by dynamic viscoelasticity measurement may be employed. A dynamic viscoelasticity measuring apparatus (Rheogel-E4000) produced by UBM Corporation, etc. may be employed to perform dynamic viscoelasticity measurement. The measurement conditions are a frequency of 10 Hz and a temperature increase rate of 2° C. per minute. The glass transition temperature is defined as a temperature at which a loss elastic modulus (E") during dynamic viscoelasticity reaches its maximum.

The resins contained in the water based adhesive solution may be two types of resins consisting of the resin A and the resin B, or three or more resins that include the resin A, the resin B, and one or more additional resins. For example, in the case that the water based adhesive solution contains three types of resins, the glass transition temperature of the third type of resin may be in the range between the glass transition temperatures of the resin A and the resin B, when designating the resin A as the resin having the lowest glass transition temperature and the resin B as a resin having a glass transition temperature higher by 80° C. or greater than that of the resin A. Alternatively, the glass transition temperature of the third type of resin may be in a range higher than the glass transition temperature of the resin B, or the third type of resin may have the same glass transition temperature as that of the resin A or resin B.

Reduction of stickiness depends on the resin with the highest glass transition temperature, while adhesive properties depend on the resin with the lowest glass transition temperature. Therefore, it is preferable for the glass transition temperature of the resin with the first lowest glass transition temperature to be less than 0° C., and may be −5° C. or less, −10° C. or less, −15° C. or less, or −20° C. or less. Close contact adhesion properties of the transfer medium to the target transfer medium can be further improved in these ranges. It is preferable for the glass transition temperature of the resin with the first highest glass transition temperature to be greater than 95° C., and may be 98° C. or greater or 100° C. or greater. In these ranges, the strength of the adhesive layer can be improved more in the target transfer medium to which the image is transferred from the transfer medium.

It is preferable for the resin A and the resin B in the water based adhesive solution to be adhesive resins, and specifically it is preferable for the resin A and the resin B to be thermoplastic resins. The resin A and the resin B may be either a water dispersible resin or a water soluble resin, respectively, but it is preferable for the resin A and the resin B to be water dispersible resins because water dispersible resins have low viscosity, favorable storage stability, and superior adhesive properties in the water based adhesive solution. The resin A and the resin B may be one of an anionic resin, a cationic resin, an amphoteric resin, and a nonionic resin, respectively, or more than one of these types of resins may be employed in combination. It is preferable for the resin A and the resin B to be resins that form a transparent coating film on the peelable sheet S, respectively. Thereby, the effect on the coloration of the water based ink in the target transfer medium to which the image is transferred from the transfer medium can be reduced.

It is preferable for the water dispersible resin to be that which is dispersible in the form of resin particles in the water based adhesive solution and can be introduced into the water based adhesive solution in the form of a resin emulsion. The water dispersible resin may be of the self-emulsifying type, in which hydrophilic groups and/or hydrophilic segments are introduced for stable dispersion in water, or may be water dispersible through the use of an external emulsifying agent.

In the case that the water dispersible resin forms resin particles in the water based adhesive solution, it is preferable for an average particle size of the resin particles to be 500 nm or less, more preferably 300 nm or less, and still more preferably 150 nm or less, from the viewpoint of inkjet ejection properties. The average particle diameter of resin particles may be in a range from 10 nm to 500 nm, for example. In addition, it is preferable for the average particle diameter of the resin particles to be within these ranges in the resin emulsion that is introduced into the water based adhesive solution. In the present specification, the average particle diameter of resin particles is a volume based average particle diameter, which is a numerical value measured by dynamic light scattering.

Water dispersible resins include, for example, conjugated diene resins such as styrene butadiene copolymers, methyl methacrylate butadiene copolymers, and vinyl chloride vinyl acetate copolymers; (meth) acrylic resins; vinyl resins such as ethylene vinyl acetate copolymers; urethane resins; melamine resins, urea resins, polyester resins, polyolefin resins, silicone resins, polyvinyl butyral resins, and alkyd resins; or functional group modified resins of these various resins which are modified by monomer containing functional groups such as carboxylic groups. By introducing hydrophilic functional groups into these resins or by surface treatment with dispersing agents, etc., oil-in-water type resin emulsions can be formed, which can then be introduced into the water based adhesive solution.

Examples of water soluble resins include polyvinyl alcohol, poly (meth) acrylic acid, neutralized poly(meth) acrylic acid, (meth) acrylic acid/maleic acid copolymers, (meth) acrylic acid/sulfonic acid copolymers, and styrene/maleic acid copolymers.

A weight average molecular weight (Mw) of the water dispersible resin is not particularly limited, but 3,000 to 1,000,000 is preferred, 5,000 to 500,000 is more preferred, and 10,000 to 300,000 is still more preferred. However, in the case of intramolecular cross linked structures, measurement may be difficult, and the upper limit is not particularly limited. In the present specification, the weight average molecular weight of a resin is a value based on polystyrene conversion by the gel permeation (GPC) method.

It is preferable for the resin A and the resin B to be a urethane resin or a (meth) acrylic resin, respectively, from the viewpoints of coating properties and adhesive properties of the water based adhesive solution. Furthermore, urethane resins and (meth) acrylic resins can improve the coating strength and flexibility as a laminate of a printed image layer and the adhesive layer in the target transfer medium to which the image is transferred from the transfer medium, respectively. It is preferable for the resin A and the resin B to be water dispersible resins from the viewpoints of coating properties and adhesive properties, respectively. In addition, water dispersible resins can suppress an increase in viscosity of the water based adhesive solution and improve storage stability. In particular, it is preferable for the resin A and the resin B to be a water dispersible urethane resin or a water dispersible (meth) acrylic resin, respectively.

Urethane resins are resins having a urethane backbone. A polyether type urethane resin that contains ether bonds in a main chain in addition to the urethane backbone, a polyester type urethane resin that contains ester bonds in a main chain in addition to the urethane backbone, a polycarbonate type urethane resin that contains carbonate bonds in a main chain in addition to the urethane backbone, and a polyester ether type urethane resin that contains ester and ether bonds in a main chain in addition to the urethane backbone are preferred.

Reaction products of poly isocyanate and polyol may be employed as the urethane resins. Reactions may be conducted according to the usual methods. One of each type of urethane resin may be employed alone, or a combination of two or more types may be employed. The poly isocyanate above is not particularly limited, as long as it is a compound having at least two isocyanate groups in a molecule.

Examples of poly isocyanates include aliphatic poly isocyanates, alicyclic poly isocyanates, aromatic poly isocyanates, and aromatic aliphatic poly isocyanates. One type of poly isocyanate may be employed alone, or a combination of two or more types of poly isocyanates may be employed. Dimers, trimers, reaction products, modifications, or polymerizations of the above poly isocyanates may also be employed as poly isocyanates.

Examples of the above polyols include low molecular weight polyols; polyether polyols, polyester polyols, polycarbonate polyols, polyolefin polyols, polyacrylate polyols, and other long chain polyols. One type of low molecular weight polyol and one type of long chain polyol may be employed alone, or a combination of two or more may be employed.

The above urethane resins may also be employed in combination with chain elongating agents and reaction stopping agents. As chain elongating agents, polyols and polyamines may generally be employed, as long as they have two or more active groups that react with isocyanate groups. Mono alcohols and monoamines may be employed as reaction stopping agents.

As an example of a urethane resin, a (meth) acrylic urethane resin may be employed. In the present specification, (meth) acrylic urethane resins are classified as urethane resins, not (meth) acrylic resins.

Examples of (meth) acrylic urethane resins include copolymers of (meth) acrylic resin and urethane resin. An example is a copolymer in which a (meth) acrylate unit or a side chain of a poly (meth) acrylic structure is introduced into a urethane backbone by polymerizing a urethane prepolymer and (meth) acrylate. A urethane prepolymer is, for example, synthesized using the poly isocyanate and polyol described above.

(Meth) acrylates include, for example, those to be described later in connection with (meth) acrylic resins. Other examples include copolymers in which a polyurethane backbone is introduced into a (meth) acrylate resin by reacting a (meth) acrylic resin having hydroxy groups with polyol and poly isocyanate. Examples of (meth) acrylic resins having hydroxy groups are those to be described later in connection with (meth) acrylic resins. Polyols and poly isocyanates include, for example, the poly isocyanates and polyols described above.

It is preferable for emulsion type urethane resins to be employed as the urethane resins. Emulsion type urethane resins can be either forced emulsification type urethane resins that use a surfactant as an emulsifying agent, or self-emulsifying type urethane resins that have hydrophilic groups introduced into the resin. Among these, self-emulsifying urethane resins are particularly preferred as emulsion type urethane resins. Sulfonic acid groups, carboxy groups, hydroxy groups, polyethylene oxy groups, amino groups, mono- or di-substituted amino groups, etc. are examples of hydrophilic groups within self-emulsifying urethane resins. Among these, sulfonic acid groups, carboxy groups, hydroxy groups, and polyethylene oxy groups are preferred as the above hydrophilic groups.

Mono polymers or copolymers having methacrylic and/or acrylic units, as well as copolymers (ethylenically unsaturated monomer) having other units together with methacrylic and/or acrylic units may be employed as (meth) acrylic resins. (Meth) acrylic resins may be obtained by polymerization using a (meth) acrylic monomer. Polymerization may be performed according to the usual methods.

Examples of (meth) acrylic monomers include (meth) acrylic acid alkyl esters, (meth) acrylic acid cycloalkyl esters, (meth) acrylic acid alkoxy alkyl esters, (meth) acrylic acid aralkyl esters, (meth) acrylic acid aryl esters, and hydroxy group-containing (meth) acrylic esters. (meth) acrylic esters, and other (meth) acrylic esters such as poly alkylene glycol (meth)acrylates, (meth) acrylic alkyl esters containing halogen atoms, (meth) acrylic esters containing amino groups, (meth) acrylic esters containing epoxy groups, (meth) acrylic esters and derivatives thereof acrylate and its derivatives, (meth) acrylate with sulfonic acid groups, (meth) acrylate with phosphoric acid groups, (meth) acrylate with isocyanate groups, (meth) acrylate with heterocyclic groups, poly alkylene glycol mono (meth) acrylate terminated with alkyl or aryl groups, etc. acrylate, poly alkylene glycol mono(meth)acrylate terminated with alkyl or aryl groups, etc. One type from among these may be employed alone or two or more types may be employed in combination in the synthesis of (meth) acrylic resins.

In addition, monomers other than (meth) acrylic monomers (hereinafter referred to as "other monomers") may be employed together. Other monomers may be employed in combination with (meth) acrylic monomers. The other monomers are not limited as long as they can be copolymerized with (meth) acrylic monomers, an may include, for example, an unsaturated carboxylic acid monomer, a styrene monomer, an unsaturated monomer with nitrogen atom, a vinyl monomer, an unsaturated alcohol, a vinyl ether monomer, a vinyl ester monomer, an unsaturated monomer having an epoxy group, an unsaturated monomer having a sulfonic acid, an ethylenically unsaturated monomer that contains an alkoxy silyl group, etc. Further, monomers having two or more polymerizable double bonds (multifunctional monomers) may also be employed. One type from among these may be employed alone or two or more types may be employed in combination in the synthesis of (meth) acrylic resins.

As an example of a (meth) acrylic resin, a styrene (meth) acrylic resin may be employed. Copolymers of styrene and (meth) acrylate may be employed as the styrene (meth) acrylic resin. One or more types of the above described types may be employed in combination as (meth) acrylate.

It is preferable for the (meth) acrylic resin to be a water dispersible (meth) acrylic resin and preferable for the water dispersible (meth) acrylic resin to be introduced into the water based adhesive solution in the form of an oil in water resin emulsion.

The following are examples of commercially available resins with a glass transition temperature (Tg) of less than 0° C. As urethane resins, the following products are commercially available: "Superflex 300 (anionic, Tg: −42° C.), Superflex 420 (anionic, Tg: −10° C.), Superflex 420NS (anionic, Tg: −10° C.), Superflex 460 (anionic, Tg: −21° C.), Superflex 460S (anionic, Tg: −28° C.), Superflex 470 (anionic, Tg: −31° C.), Superflex 500M (nonionic, Tg: −39° C.), Superflex 650 (cationic, Tg: −17° C.), Superflex 740 (anionic, Tg: −34° C.), Superflex E-2000 (nonionic, Tg: −38° C.), and Superflex E-4800 (nonionic, Tg: −65° C.)" produced by Daiichi Kogyo Seiyaku Co., Ltd.; and "Takelac W-6110 (anionic, Tg: −20° C.)" produced by Mitsui Chemicals Inc. (all are product names).

Examples of (meth) acrylic resins include "Movinyl 702 (anionic, Tg: −19° C.), Movinyl 7525 (anionic, Tg: −16° C.), Movinyl LDM7522 (anionic, Tg −15° C.), Movinyl LDM7010 (anionic, Tg: −22° C.), Movinyl 461 (anionic, Tg: −48° C.), Movinyl 462 (anionic, Tg: −48° C.), Movinyl 490 (anionic, Tg: −53° C.), Movinyl 987A (anionic, Tg: −2° C.), Movinyl S-71 (anionic, Tg: −53° C.), Movinyl 718A (anionic, Tg: −6° C.), Movinyl 730L (nonionic, Tg: −13° C.), Movinyl 7320 (anionic, Tg: −20° C.), Movinyl 7400 (anionic, Tg −41° C.), and Movinyl 7420 (anionic, Tg: −26° C.)" produced by Japan Coating Resin Corporation (all are product names).

Examples of styrene acrylic resins include "NeoCryl A-1120 (anionic, Tg: −9° C.)" produced by DSM Co., "Movinyl 6730 (anionic, Tg: −2° C.), Movinyl 7502 (anionic, Tg: −35° C.), Movinyl VDM7410 (anionic, Tg: −4° C.), and Movinyl 6960 (anionic, Tg: −23° C.)" produced by Japan Coating Resin Corporation, etc. (all are product names).

The following are examples of commercially available resins with glass transition temperatures (Tg) greater than 95° C. The following products are commercially available as urethane resins: "Superflex 130 (anionic, Tg: 101° C.)" produced by Daiichi Kogyo Seiyaku Co., Ltd., "Takelac W-405 (anionic, Tg: 135° C.), Takelac W-605 (anionic, Tg: 100° C.), Takelac WS-4000 (anionic, Tg: 136° C.), Takelac WS-4022 (anionic, Tg: 115° C.), and Takelac WS-5100 (anionic, Tg: 120° C.)" produced by Mitsui Chemicals Inc., and "DAOTANTW6493 (anionic, Tg: 100° C.)" produced by Daicelallnex Ltd. (all are product names).

"NeoCryl XK-52 (anionic, Tg: 108° C.)" (product name) produced by DSM Co. is an example of a (meth) acrylic resin. "Movinyl 972 (anionic, Tg: 101° C.)" (product name) produced by Japan Coating Resin Corporation is an example of a styrene acrylic resin.

The following are examples of commercially available resins with glass transition temperatures (Tg) between 0° C. and 95° C. The following products are commercially available as urethane resins: "Superflex 126 (anionic, Tg: 72° C.), Superflex 150 (anionic, Tg: 40° C.), Superflex 150HS (anionic, Tg: 32° C.), Superflex 170 (anionic, Tg: 75° C.), Superflex 210 (anionic, Tg: 41° C.), Superflex 620 (anionic, Tg: 43° C.), Superflex 820 (anionic, Tg: 46° C.), Superflex 830HS (anionic, Tg: 68° C.), Superflex 860 (anionic, Tg: 36° C.), and Superflex 870 (anionic, Tg: 78° C.)" produced by Daiichi Kogyo Seiyaku Co., Ltd., "Takelac W-5030 (anionic, Tg: 85° C.), Takelac W-5661 (anionic, Tg: 70° C.), Takelac W-6010 (anionic, Tg: 90° C.), Takepack W-6020 (anionic, Tg: 90° C.), Takepack W-6061 (anionic, Tg: 25° C.), Takelack W-635 (anionic, Tg: 70° C.), and Takelac WS-5984 (anionic, Tg: 70° C.)" (all are product names) produced by Mitsui Chemicals Inc.

Examples of (meth) acrylic resins include "Movinyl 727 (anionic, Tg: 5° C.), Movinyl 742A (anionic, Tg: 45° C.), Movinyl 743N (anionic, Tg: 37° C.), Movinyl 745 (anionic, Tg: 21° C.), Movinyl 1711 (anionic, Tg: 30° C.), Movinyl 6520 (anionic, Tg: 41° C.), Movinyl 6530 (anionic, Tg: 30° C.), Movinyl 7180 (anionic, Tg: 53° C.), Movinyl 7470 (nonionic, Tg: 42° C.), Movinyl 7720 (Nonionic, Tg: 4° C.), Movinyl 7820 (cationic, Tg: 4° C.), Movinyl DM772 (Anionic, Tg: 6° C.), Movinyl DM774 (Anionic, Tg: 13° C.), Movinyl LDM7156 (Anionic, Tg: 37° C.), Movinyl LDM7520 (Anionic Tg: 4° C.), Movinyl 7980 (anionic, Tg: 55° C.), Movinyl 735 (anionic, Tg: 14° C.), Movinyl 742A (nonionic, Tg: 39° C.), Movinyl 747 (nonionic, Tg: 42° C.), Movinyl LDM7582 (nonionic, Tg: 26° C.), Movinyl 710A (anionic, Tg: 9° C.), and Movinyl 731A (nonionic, Tg: 0° C.)" produced by Japan Coating Resin Corporation, and "NeoCryl A1105 (anionic, Tg: 93° C.)" produced by DSM Co. (all are product names).

Examples of styrene acrylic resins include "Movinyl 749E (anionic, Tg: 25° C.), Movinyl 752 (anionic, Tg: 15° C.), Movinyl 880 (anionic, Tg: 3° C.), Movinyl 940 (anionic, Tg: 3° C.), Movinyl 1752 (anionic, Tg: 16° C.), Movinyl 1760 (anionic, Tg: 7° C.), Movinyl 6720 (anionic, Tg: 34° C.), Movinyl DM60 (anionic, Tg: 3° C.), and Movinyl 975N (anionic, Tg: 27° C.)" produced by Japan Coating Resin Corporation. (all are product names).

Examples of commercially available water dispersible (meth) acrylic urethane resins include DAOTAN TW6462, DAOTANVTW6463, DAOTANVTW6464, DAOTANVTW6471, DAOTANVTW6473, DAOTANVTW6474, DAOTANVTW1262, and DAOTANVTW1265 produced by DAICEL-ALLNEX Ltd. (all are product names).

In addition, the following are examples of commercially available resins that can be introduced into the water based adhesive solutions as oil in water type resin emulsions. Ethylene-vinyl acetate copolymers, such as those in the Sumikaflex series (201HQ, 305HQ, 355HQ, 400HQ, 401HQ, 408HQ, 410HQ, 450HQ, 455HQ, 456HQ, 460HQ, 465HQ, 467HQ, 470HQ, 510HQ, 520HQ, 752, and 755) produced by Sumitomo Chemical Industry Co., Ltd., and those in the Vinibran series (3483Y, 4018, 4495L, and 4495H) produced by Nissin Chemical Industry Co., Ltd., and those in the Polysol series (EVA AD-2, EVA AD-10, EVA AD-13, EVA AD-17, EVA AD-70, EVA AD-96, and EVA EL-851) produced by Showa Denko Co., Ltd. (all are product names).

Examples of water dispersible polyolefin resins include the Arrow Base series (SB-1010, SE-1010, and DC1010) produced by Unitika Ltd., the Hardlen series (NZ1004, EW5250, and EH801J) produced by Toyobo Co., Ltd., and the AQUACER series (272, 497, 515, 531, and 537) produced by BYK-Chemie GmbH (all are product names).

The resin A and the resin B may be employed as combinations of various resins such that the difference in the glass transition temperatures thereof is 80° C. or greater. A combination of the above example resins exemplified above may be employed, for example. It is preferable for one of the resin A and the resin B to be a urethane or (meth) acrylic resin. It is also preferable for the resin A and the resin B to be urethane resins or (meth) acrylic resins, respectively. The resin A and the resin B may be the same type of resin as each other, or they may be different types of resins from each other. For example, it is preferable for both of the resin A and the resin B to be urethane resins or for both of the resin A and the resin B to be (meth) acrylic resins.

In the water based adhesive solution, it is preferable for the resin A and the resin B to be contained at a ratio within a range from 50:50 to 90:10 by mass, more preferably a range from 55:45 to 80:20 by mass, and still more preferably a range from 60:40 to 70:30. A high content of resin A in these ranges allows for greater robustness in target transfer media that employ soft base materials such as cloth. Meanwhile, a high content of resin B in these ranges can increase the robustness in target transfer media using hard base materials such as plastic.

From the viewpoint of increasing robustness in a target transfer medium that employs various materials and of further improving inkjet ejection properties, a range from 1 to 20% by mass of the resin A is preferred, a range from 5 to 15% by mass is more preferred, and 8 to 10% by mass is still more preferred with respect to the total mass of the water based adhesive solution. From the viewpoint of increasing robustness in a target transfer medium that employs various materials and further of improving inkjet ejection properties, a range of 0.5 to 10 mass % of the resin B is preferred, a range from 1 to 8 mass % is more preferred, and a range from 4 to 6 mass % is still more preferred, with respect to the total mass of the water based adhesive solution.

It is preferable for the total amount of all types of resins in the water based adhesive solution to be within a range from 1.5 to 30% by mass, more preferably a range from 5 to 20% by mass, still more preferably a range from 10 to 15% by mass, with respect to the total mass of the water based adhesive solution. Inkjet ejection properties can be improved greater in these ranges, and furthermore, the adhesive properties of the transfer sheet can be improved to a greater degree.

The water based adhesive solution is preferably an aqueous composition that contains water, and the main solvent may be water. Although the water is particularly not limited, it should be free of ionic components as much as possible. For example, ion exchanged water, distilled water, pure or ultrapure water, etc. may be employed as the water. From the viewpoint of viscosity adjustment and polarity adjustment, it is preferable for the water to be within a range from 20 to 90% by mass, and still more preferably a range from 40 to 80 mass % of the total mass of the water based adhesive solution and an range from 50 to 70 mass % of the total mass of the water based adhesive solution is still yet more preferred.

The water based adhesive solution may contain water soluble organic solvents in addition to or instead of water. As a water soluble organic solvent, from the viewpoint of wettability and moisture retention, an organic compound that is a liquid at room temperature (25° C.) and can be dissolved or be miscible in water can be employed, and a water soluble organic solvent that mixes uniformly with the same volume of water at 1 atm and 20° C. is preferred.

Examples of water soluble organic solvents are those that include lower alcohols such as methanol, ethanol, 1-propanol, isopropanol, 1-butanol, 2-butanol, isobutanol, 2-methyl-2-propanol; glycols such as ethylene glycol, diethylene glycol, triethylene glycol, tetra ethylene glycol, polyethylene glycol, propylene glycol, dipropylene glycol, tripropylene glycol, polypropylene glycol, 1,2 butanediol; glycerins such as glycerin, diglycerin, triglycerin, polyglycerin; acetins such as monoacetin and diacetin; glycol ethers such as glycol monomethyl ethers, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, and tetraethylene glycol dimethyl ether; triethanolamine, 1-methyl-2-pyrrolidone, 1,3-dimethyl-2-imidazolidinone, β-thiodiglycol, and sulfolan. One type of water soluble organic solvent may be employed alone, or a two or more types of the water soluble organic solvent may be employed in combination as long as they form a single phase. It is preferable for the boiling point of the water soluble organic solvent to be 100° C. or greater, and more preferably 150° C. or The water soluble organic solvent may be contained in an amount within a range from 1 to 80% by mass, more preferably a range from 5 to 50% by mass, and still more preferably a range from 10 to 20% by mass with respect to the total mass of the aqueous adhesive liquid, from the viewpoints of wettability, moisturizing effect, viscosity control, etc. In the case that two or more water soluble organic solvents are employed, the total amount of the two or more water soluble organic solvents is preferably within these ranges. It is preferable for the total amount of the water soluble organic solvent and water to be in a range from 20 to 90% by mass, a range from 40 to 80% by mass, or a range from 60 to 75% by mass with respect to the total mass of the aqueous adhesive liquid.

The aqueous adhesive solution may further contain a surfactant. Any of an anionic, a cationic, an amphoteric, or a nonionic surfactant may be employed as a surfactant, although nonionic surfactants are more preferred. In addition, either low molecular weight surfactants or high molecular weight surfactants may be employed. It is preferable for the HLB value of the surfactant to be within a range from 5 to 20, and more preferably a range from 10 to 18.

Examples of nonionic surfactants include ester type surfactants such as glycerol fatty acid esters and fatty acid sorbitan esters; ether type surfactants such as polyoxy ethylene alkyl ethers, polyoxy ethylene alkyl phenyl ethers, polyoxy propylene alkyl ethers; ether ester type surfactants such as polyoxy ethylene sorbitan fatty acid esters; acetylene surfactants; silicone surfactants; fluorinated surfactants, etc. Among these, acetylene surfactants, silicone surfactants, and fluorinated surfactants may be favorably employed, and acetylene surfactants are more preferred.

Acetylene surfactants include, for example, acetylene glycol surfactants, acetylene alcohol surfactants, and surfactants with acetylene groups. Acetylene glycol surfactants are glycols having acetylene groups, preferably glycols having a symmetrical structure with the acetylene group being centrally located, and may also have a structure with ethylene oxide added to the acetylene glycol.

Examples of commercially available acetylene surfactants include Surfinol 104E, Surfinol 104H, Surfinol 420, Surfinol 440, Surfinol 465, Surfinol 485, etc. in the Surfinol series produced by Evonik Industries AG, and Orfin E1004, Orfin E1010, Orfin E1020, etc. in the Orfin series produced by Nissin Chemical Industry Co., Ltd. (all are product names).

Examples of silicone surfactants include polyether modified silicone surfactants, alkyl alkyl co modified silicone surfactants, and acrylic silicone surfactants. Examples of commercially available silicone surfactants include SILFACE SAG002 and SILFACE 503A produced by Nissin Chemical Industry Co., Ltd. (both are product names).

Examples of other nonionic surfactants include polyoxy ethylene alkyl ether surfactants such as Emulgen 102KG, Emulgen 103, Emulgen 104P, Emulgen 105, Emulgen 106, Emulgen 108, Emulgen 120, Emulgen 147, Emulgen150, Emulgen220, Emulgen350, Emulgen404, Emulgen420, Emulgen 705, Emulgen707, Emulgen709, Emulgen1108, Emulgen4085, Emulgen2025G, etc. produced by Kao K. K. (all are product names).

Examples of anionic surfactants include, for example, Emal 0, Emal 10, Emal 2F, Emal 40, Emal 20C, etc. in the Emal series produced by Kao Corporation; Neopelex GS, Neopelex G-15, Neopelex G-25, Neopelex G-65, etc. in the Neopelex series produced by Kao Corporation; and Pelex OT-P, Pelex TR, Pelex CS, Pelex TA, Pelex SS-L, Pelex SS-H, etc. in the Pelex series produced by Kao Corporation, and Demol N, Demol NL, Demol RN, Demol MS, etc. in the Demol series produced by Kao Corporation (all are product names).

Examples of cationic surfactants include, for example, Acetamin 24, Acetamin 86, etc. in the Acetamin series produced by Kao Corporation, Quartamin 24P, Quartamin 86P, Quartamin 60W, Quartamin 86W, etc. in the Quartamin series produced by Kao Corporation, and Sanisol C, Sanisol Sanisol B-50, etc. in the Sanisol series produced by Kao Corporation (all are product names).

Examples of amphoteric surfactants include Amphitol 20BS, Amphitol 24B, Amphitol 86B, Amphitol 20YB, and Amphitol 20N in the Amphitol series produced by Kao Corporation (all are product names).

One type of surfactant may be employed alone or a combination of two or more types of surfactants may be employed. It is preferable for the content of surfactant to be within a range from 0.1 to 5% by mass, and more preferably a range from 0.2 to 2% by mass with respect to the total mass of the water based adhesive solution.

In addition to the above components, the water based adhesive solution may optionally contain various additives such as rust inhibitors, preservatives, antioxidants, UV absorbers, infrared absorbers, cross-linking agents, pH adjusters, defoaming agents, wetting agents (humectants), surface tension adjusters (penetrating agents), fixing agents, etc. to the extent that the effects of the present disclosure will not be impaired. It is preferable for the total amount of the various additives to be 10% by mass or less, more preferably 5% by mass or less, and still more preferably 1% by mass or with respect to the total mass of the water based adhesive solution.

It is preferable for the viscosity of the water based adhesive solution to be within a range from 1 to 30 mPa·s, more preferably a range from 2 to 20 mPa·s, and still more preferably a range from 3 to 15 mPa·s at 23° C., in order to obtain ejection properties suitable for the inkjet method. In the present specification, the viscosity of the water based adhesive solution is a value measured at 23° C. using a rotational viscometer. "Rheometer MCR302" produced by Anton Paar Japan K.K., for example, may be employed as a viscosity measuring apparatus.

It is preferable for the surface tension of the water based adhesive solution to be within a range from 20 mN/m to 40 mN/m at 23° C. In the present specification, the surface tension of the water based adhesive solution may be determined according to the bubble pressure method (maximum bubble pressure method). The surface tension may be measured using the "SITA Messtechnik GmbH science line t60" produced by SITA Process Solutions, for example.

The method of producing the water based adhesive solution is not particularly limited, and a desired water based adhesive solution may be obtained by blending each component as appropriate. An obtained composition may be filtered by employing a filter or the like. Various additives may also be added as appropriate.

Next, an example of a peelable sheet S employed in the above embodiment of the transfer medium producing apparatus will be described.

The peelable sheet S is that which, after a laminate that contains a layer of a printed image and an adhesive layer is formed on a surface thereof, the laminate can be peeled off from the peelable sheet S. The peelable sheet S has a peelable surface, in which the surface has an uneven shape, the surface has peelable properties, or a combination of these two configurations, for example.

One aspect of the peelable sheet S has a base material and a protective layer which is formed on the base material so as to be peelable therefrom. The base material is not particularly limited as long as it is removable from the protective layer, and an opaque, translucent, or transparent base material may be employed. The base material may be either a rigid base material or a flexible base material, but a flexible base material is preferred such that it can follow the surface shape of a target transfer medium. Releasable base materials, such as release treated paper, release treated plastic film, etc., may be favorably employed as the base material.

Although there are no particular limitations regarding plastic films, polyesters and the like are preferred from the viewpoints of mechanical strength, heat resistance, workability, etc., and polyethylene terephthalate is particularly preferred. Release properties can be imparted by treating the base material with a releasing agent, for example, as is common practice. Release agents include waxes, higher fatty acid salts, fatty acid esters, higher fatty acid amides, silicone oils, silicone resins, etc. Various thermoplastic resins, thermosetting resins, elastomers, etc. may be employed for the protective layer, as long as the protective layer is removable from the base material, protects an image when transferred to a target transfer medium, and does not significantly interfere with image quality.

Another aspect of the peelable sheet S has a base material, a protective layer formed on the base material so as to be peelable therefrom, and an ink receiving layer formed on the protective layer. The ink receiving layer may be made of a material capable of absorbing and retaining ink, and may be constituted by inorganic particles, a cationic polymer, a hydrophilic polymer, thermoplastic resin particles, thermosetting resin particles, an elastomer, etc.

Examples of commercially available products for the peelable sheet S include transfer films available from Eastman Kodak Corp. (USA), McLaud Technology Corp. (USA), Ecofreen Co., Ltd. (Korea), etc.

The present disclosure is not limited to the embodiments described above, but may be embodied by modifying each of the components to an extent that it does not depart from the spirit thereof at a stage of implementation. Also, various inventions may be achieved by appropriate combinations of the plurality of components disclosed in the above embodiments. For example, all of the components disclosed in the embodiments may be combined as appropriate. It is a matter of course that various modifications and applications are possible within a scope that does not depart from the spirit of the disclosure.

The following additional items are further disclosed with respect to the present disclosure.

(Item 1)

A transfer medium producing apparatus of the present disclosure is equipped with an ink ejection unit that ejects ink onto a peelable sheet, an adhesive solution application unit that applies adhesive solution onto the peelable sheet onto which the ink has been ejected, and a control unit that controls the ejection of the ink and the application of the adhesive solution to be performed by a wet on wet method.

(Item 2)

The transfer medium producing apparatus according to Item 1 may be equipped with a conveyance unit that relatively conveys at least one of the ink ejection unit and the adhesive solution application unit, and the peelable sheet relative to each other in a predetermined conveyance direction, and the ink ejection unit and the adhesive solution application unit may be arranged at different positions with respect to the conveying direction.

(Item 3)

The transfer medium producing apparatus according to Item 2 may be equipped with a first moving mechanism for moving the ink ejection unit in a direction perpendicular to the conveyance direction and a second moving mechanism for moving the adhesive solution application unit in a direction perpendicular to the conveyance direction.

(Item 4)

The ink ejection unit of the transfer medium producing apparatus according to Item 2 may be equipped with a first head unit that forms a printed image by ejecting ink onto the peelable sheet and a second head unit that forms a single color image by ejecting ink onto the peelable sheet on which the printed image has been formed, and the first head unit and the second head unit may be arranged at different positions in the conveyance direction.

(Item 5)

In the transfer medium producing apparatus according to any of Items 1 to 4, a control unit may control the ink ejection unit and the adhesive solution application unit such that the resolution of the adhesive solution applied by the adhesive solution application unit is lower than the resolution of the ink ejected by the ink ejection unit.

(Item 6)

In the transfer medium producing apparatus according to any of Items 1 to 5, the control unit may control the ink ejection unit and the adhesive solution application unit such that an amount of adhesive solution applied per unit time by the adhesive solution application unit is greater than an amount of ink ejected per unit time by the ink ejection unit.

(Item 7)

In the transfer medium producing apparatus according to Item 6, the control unit may increase a drive frequency of the adhesive solution application unit such that it is higher than a drive frequency of the ink ejection unit.

(Item 8)

In the transfer medium producing apparatus according to any of Items 1 to 7, an amount of time between ink ejection from the ink ejection unit onto a predetermined area and application of the adhesive solution by the adhesive solution application unit onto the predetermined area may be 100 seconds or less.

(Item 9)

A transfer medium producing method of the present disclosure is a transfer medium producing method in which ink is ejected onto a peelable sheet and an adhesive solution is applied on the peelable sheet onto which the ink has been ejected to produce a transfer medium, wherein the ejection of the ink and the application of the adhesive solution are performed by a wet on wet method.

What is claimed is:

1. A transfer medium producing apparatus, comprising:
an ink ejection unit, including at least an inkjet head, that ejects ink onto a peelable sheet;
an adhesive solution application unit, including at least an other inkjet head, that applies adhesive solution onto the peelable sheet onto which the ink has been ejected; and
a controller configured to control the ejection of the ink and the application of the adhesive solution to be performed such that the ink is ejected by the ink ejection unit before the adhesive solution applied by the adhesive solution application unit has dried,
wherein the adhesive solution application unit is provided downstream from the ink ejection unit with respect to a predetermined conveyance direction of the peelable sheet.

2. The transfer medium producing apparatus according to claim 1, further comprising:
a conveyance unit, including at least a first and a second conveyance roller, that relatively conveys at least one of the ink ejection unit and the adhesive solution application unit, and the peelable sheet relative to each other in the predetermined conveyance direction; and
the ink ejection unit and the adhesive solution application unit are arranged at different positions with respect to the conveyance direction.

3. The transfer medium producing apparatus according to claim 2, further comprising:
   a first moving mechanism that moves the ink ejection unit in a direction perpendicular to the conveyance direction; and
   a second moving mechanism that moves the adhesive solution application unit in a direction perpendicular to the conveyance direction.

4. The transfer medium producing apparatus according to claim 2, wherein:
   the ink ejection unit further comprises the inkjet head that forms a printed image by ejecting ink onto the peelable sheet and a second inkjet head that forms a single color image by ejecting ink onto the peelable sheet on which the printed image has been formed; and
   the inkjet head and the second inkjet head are arranged at different positions in the conveyance direction.

5. The transfer medium producing apparatus according to claim 1, wherein:
   the controller is further configured to control the ink ejection unit and the adhesive solution application unit such that a resolution of the adhesive solution applied by the adhesive solution application unit is lower than a resolution of the ink ejected by the ink ejection unit.

6. The transfer medium producing apparatus according to claim 1, wherein:
   the controller is further configured to control the ink ejection unit and the adhesive solution application unit such that an amount of adhesive solution applied per unit time by the adhesive solution application unit is greater than an amount of ink ejected per unit time by the ink ejection unit.

7. The transfer medium producing apparatus according to claim 6, wherein:
   the controller is further configured to control increases in a drive frequency of the adhesive solution application unit such that it is higher than a drive frequency of the ink ejection unit.

8. The transfer medium producing apparatus according to claim 1, wherein:
   an amount of time between ink ejection from the ink ejection unit onto a predetermined area and application of the adhesive solution by the adhesive solution application unit onto the predetermined area is 100 seconds or less.

9. A transfer medium producing method comprising:
   ejecting ink onto a peelable sheet; and
   applying an adhesive solution on the peelable sheet onto which the ink has been ejected to produce a transfer medium, wherein
   the ejection of the ink and the application of the adhesive solution is being performed by a wet on wet method.

* * * * *